United States Patent
Chinnakkonda Vidyapoornachary et al.

(10) Patent No.: US 10,628,248 B2
(45) Date of Patent: Apr. 21, 2020

(54) AUTONOMOUS DRAM SCRUB AND ERROR COUNTING

(71) Applicant: International Business Machines Corporation, Armonk, NY (US)

(72) Inventors: Diyanesh B. Chinnakkonda Vidyapoornachary, Bangalore (IN); Marc A. Gollub, Pflugerville, TX (US); Warren E. Maule, Cedar Park, TX (US); Tony E. Sawan, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/070,273

(22) Filed: Mar. 15, 2016

(65) Prior Publication Data
US 2017/0269979 A1    Sep. 21, 2017

(51) Int. Cl.
G06F 11/00    (2006.01)
G06F 11/07    (2006.01)
G06F 11/10    (2006.01)

(52) U.S. Cl.
CPC .......... *G06F 11/076* (2013.01); *G06F 11/073* (2013.01); *G06F 11/0727* (2013.01); *G06F 11/106* (2013.01)

(58) Field of Classification Search
None
See application file for complete search history.

(56) References Cited

U.S. PATENT DOCUMENTS

| | | | |
|---|---|---|---|
| 6,101,614 A | 8/2000 | Gonzales et al. | |
| 6,560,725 B1 * | 5/2003 | Longwell | G06F 11/073 |
| | | | 711/105 |
| 6,838,331 B2 | 1/2005 | Klein | |
| 8,245,087 B2 | 8/2012 | Abts et al. | |
| 8,255,772 B1 | 8/2012 | Foley | |
| 9,081,693 B2 | 7/2015 | Ramaraju et al. | |
| 9,146,811 B2 | 9/2015 | Laberge et al. | |
| 2005/0022065 A1 * | 1/2005 | Dixon | G06F 11/106 |
| | | | 714/42 |

(Continued)

FOREIGN PATENT DOCUMENTS

WO    9829811    7/1998

OTHER PUBLICATIONS

Sridharan et al., "A Study of DRAM Failures in the Field", IEEE, 2012; 11 pages.

*Primary Examiner* — Mujtaba M Chaudry
(74) *Attorney, Agent, or Firm* — Cantor Colburn LLP; Nathan Rau

(57) ABSTRACT

An aspect includes a method for dynamic random access memory (DRAM) scrub and error counting. A scrub operation is performed at memory locations in a DRAM. The performing includes, for each of the memory locations: receiving a refresh command at the DRAM; executing a read/modify/write (RMW) operation at the memory location, the executing including writing corrected bits to the memory location; and incrementing an error count in response to detecting an error during the executing. The method also includes comparing the error count to an error threshold. An alert is initiated in response to the error count exceeding the error threshold.

19 Claims, 4 Drawing Sheets

(56) References Cited

U.S. PATENT DOCUMENTS

| | | | |
|---|---|---|---|
| 2006/0224808 A1* | 10/2006 | Depew | G06F 13/24 |
| | | | 710/267 |
| 2007/0022244 A1 | 1/2007 | Kimmery | |
| 2007/0226428 A1* | 9/2007 | Tremaine | G06F 12/0802 |
| | | | 711/154 |
| 2010/0332900 A1 | 12/2010 | Yang | |
| 2012/0317352 A1* | 12/2012 | Kang | G11C 11/40611 |
| | | | 711/106 |
| 2014/0281810 A1* | 9/2014 | Gifford | G06F 11/106 |
| | | | 714/764 |
| 2016/0092306 A1* | 3/2016 | Benedict | G06F 11/1076 |
| | | | 714/764 |
| 2017/0052840 A1* | 2/2017 | Kim | G11C 29/50016 |
| 2017/0060681 A1* | 3/2017 | Halbert | G06F 11/1068 |
| 2017/0123903 A1* | 5/2017 | Eguchi | G11C 29/52 |
| 2017/0161143 A1* | 6/2017 | Reed | G06F 11/1068 |

\* cited by examiner

US 10,628,248 B2

AUTONOMOUS DRAM SCRUB AND ERROR COUNTING

BACKGROUND

The present invention relates to computer memory systems, and more specifically, to autonomous dynamic random access memory (DRAM) scrub and error counting.

Error-correcting code (ECC) memory is a type of computer data storage that can detect and correct the most common kinds of internal data corruption. ECC memory is used in computer systems where data corruption cannot be tolerated, such as for scientific or financial computing. Typically, ECC memory maintains a memory system that is immune to single-bit-errors. Data that is read from each word is always the same as the data that had been written to it, even if one or more bits actually stored have been flipped to the wrong state. DRAM devices often include extra memory bits and logic to exploit these extra memory bits to correct single bit errors in a memory bit word.

In contemporary memory systems, a memory controller scans systematically through locations in a DRAM to perform a scrub operation on each memory location in the DRAM. Memory scrub operations include reading from a memory location in a memory device, correcting single bit errors (if any) in the read data with an ECC, and writing the corrected data back to the same memory location. During the scrub process, an ECC decoder that is internal to the DRAM is used to detect and correct bit errors. By scrubbing each memory location on a frequent enough basis, the probability of encountering uncorrectable multiple bit errors is reduced.

SUMMARY

Embodiments include a method, system, and computer program product for dynamic random access memory (DRAM) scrub and error counting. A method includes performing a scrub operation at memory locations in a DRAM. The performing includes, for each of the memory locations: receiving a refresh command at the DRAM; executing a read/modify/write (RMW) operation at the memory location, the executing including writing corrected bits to the memory location; and incrementing an error count in response to detecting an error during the executing. The method also includes comparing the error count to an error threshold. An alert is initiated in response to the error count exceeding the error threshold.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
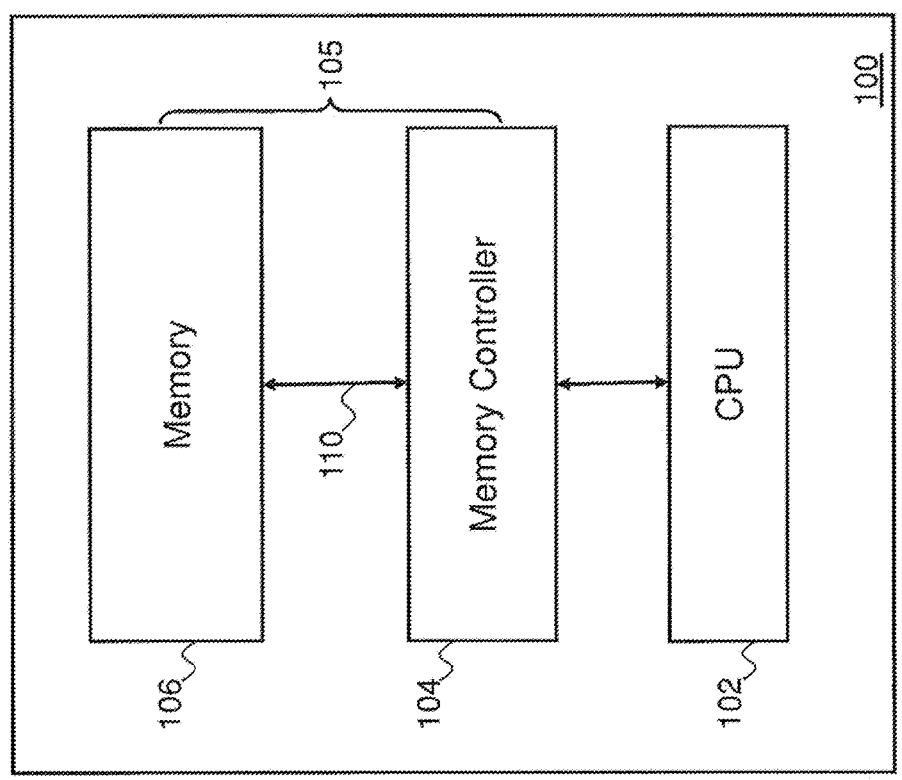
FIG. 1 is a block diagram of an exemplary system according to one or more embodiments of the invention.

Embodiments described herein are directed to improving the data detection and correction capability of dynamic random access memories (DRAMs) by using autonomous DRAM scrub and error counting.

In contemporary memory systems, a memory controller typically drives a data scrub operation by specifying a word location to be scrubbed. The memory controller passes the address of the word location to be scrubbed to the memory by registering the scrub command. This memory controller driven process can result in a large amount of overhead and complexity in the memory controller to ensure that all the data locations in a DRAM are scrubbed. Additional overhead in terms of occupying mainline traffic bandwidth and channel power penalties in handling scrub requests from the memory controller to the DRAM can also result. Embodiments described herein reduce this overhead and complexity by providing autonomous DRAM scrubbing of single bit failures which is triggered by a refresh command and eliminates the need for memory controller (or firmware) management of the data scrub operation.

In memories where single bit errors are corrected automatically by logic in the memory (e.g., ECC memory), the memory controller has no visibility to the number of single bit errors (hard or soft errors) that a particular memory is experiencing and thus, cannot tell if the number of single bit errors is getting high enough to warrant a reliability or availability concern. In general, DRAM vendors reveal an error count, but only above a threshold that they consider normal for a particular device. This number is not made available to purchasers/users of the DRAM and can vary between different vendors and technologies. Eventually single bit flips can accumulate to become uncorrectable by the DRAM and also uncorrectable by the memory controller ECC if they affect multiple DRAMs. Embodiments described herein reduce the chance of this occurring by performing the memory data scrub operation to write corrected data values to the DRAMs. Embodiments described herein can also reduce the change of uncorrectable errors by keeping track of the number of single bit errors encountered during the scrub process and sending an alert signal if the number of errors exceeds a programmable threshold.

Embodiments described herein improve memory reliability, availability, and serviceability (RAS) by improving the error detection and correction operation in a DRAM that uses an inbuilt ECC decoder. In embodiments, the memory controller sets the DRAM to scrub mode using a mode register set (MRS) command and provides an internal address pointer to point to the word location in the DRAM for a scrub operation at that location. When a "refresh" command is registered, the current location pointed to by the internal address pointer is scrubbed and the pointer is incremented to the next location in the memory. The next refresh command causes a scrub of the next memory location and so on to ensure that all of the memory locations are scrubbed with the register of an external refresh command. Thus, in accordance with embodiments, as part of performing refresh commands, a DRAM autonomously cycles through all addresses of all memory locations in the DRAM, performing a scrub operation that includes a read/modify/write (RMW) to correct single bit fails. Embodiments can be utilized for both internal and external refresh operations. In the case of external refresh, embodiments free up the mainline (e.g., the bus between the memory controller and the DRAM) by not having separate scrub commands sent to DRAM. In accordance with embodiments, all internal locations of the DRAM are scrubbed atomically, that is that periodic refresh, which is already required, triggers the DRAM to scrub and increment to the next address. So after enough refreshes, all addresses are scrubbed, at which point the address pointer resets to the beginning of the DRAM, and the process continues in a loop.

Embodiments provide autonomous internal DRAM scrubbing of single bit fails, triggered by a refresh command, thereby eliminating the need for memory controller or firmware management of the scrub operation. In embodiments, an alert signal, generated by scrub logic in the DRAM or based on firmware polling of an internal DRAM counter, can be utilized to indicate when the error count is getting too high (e.g., higher than a programmable threshold). In addition, embodiments do not require DRAM vendors to reveal their internal expected error count threshold. Thus, vendors can maintain their own internal threshold based on what they consider normal for their particular devices.

As used herein, the term DRAM is used to refer to one particular type of memory that may be utilized by embodiments. Other types of memory devices such as, but not limited to: static random access memory (SRAM) and embedded DRAM (EDRAM) may also be utilized by embodiments.

The granularity of the scrub operation can be based on the granularity of the ECC calculation. For example, if ECC is calculated on a group of 64 bits at a time, then the data scrub process can process 64 bits (or a multiple of 64 bits) each time that the scrub process is performed. In this example, the word length is 64 bits and 64 bits are read from and written to the memory location in each cycle of the scrub operation. In embodiments, the refresh and scrub operations are independent of each other, having different granularities and operating on different memory locations in each cycle. In other embodiments, in order to avoid saving two address pointers, the refresh and scrub operations are performed at the same memory location in each cycle.

FIG. 1 illustrates a block diagram of a system 100, which is a computer system that supports using autonomous DRAM scrub and error counting in accordance with one or more embodiments. The system 100 depicted in FIG. 1 includes a computer processor 102, memory 106 including multiple memory devices (e.g., DRAMs), and a memory controller 104 for reading and storing data in the memory 106 via an interface 110. Collectively, the memory controller 104 and the memory 106 are referred to as a memory system 105. The computer processor 102 can be a single core or multi-core processor. In one or more embodiments the memory controller 104 is coupled to the computer processor 102 and receives read or write requests from the computer processor 102.

The system 100 is one example of a configuration that may be utilized to perform the processing described herein. Although the system 100 has been depicted with only a memory 106, memory controller 104, and computer processor 102, it will be understood that other embodiments would also operate in other systems including additional elements, e.g., multiple computers processors 102 and multiple levels of memory 106. In an embodiment, the memory 106, memory controller 104, and computer processor 102 are not located within the same computer. For example, the memory 106 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, and computer processor 102.

Figure 2:
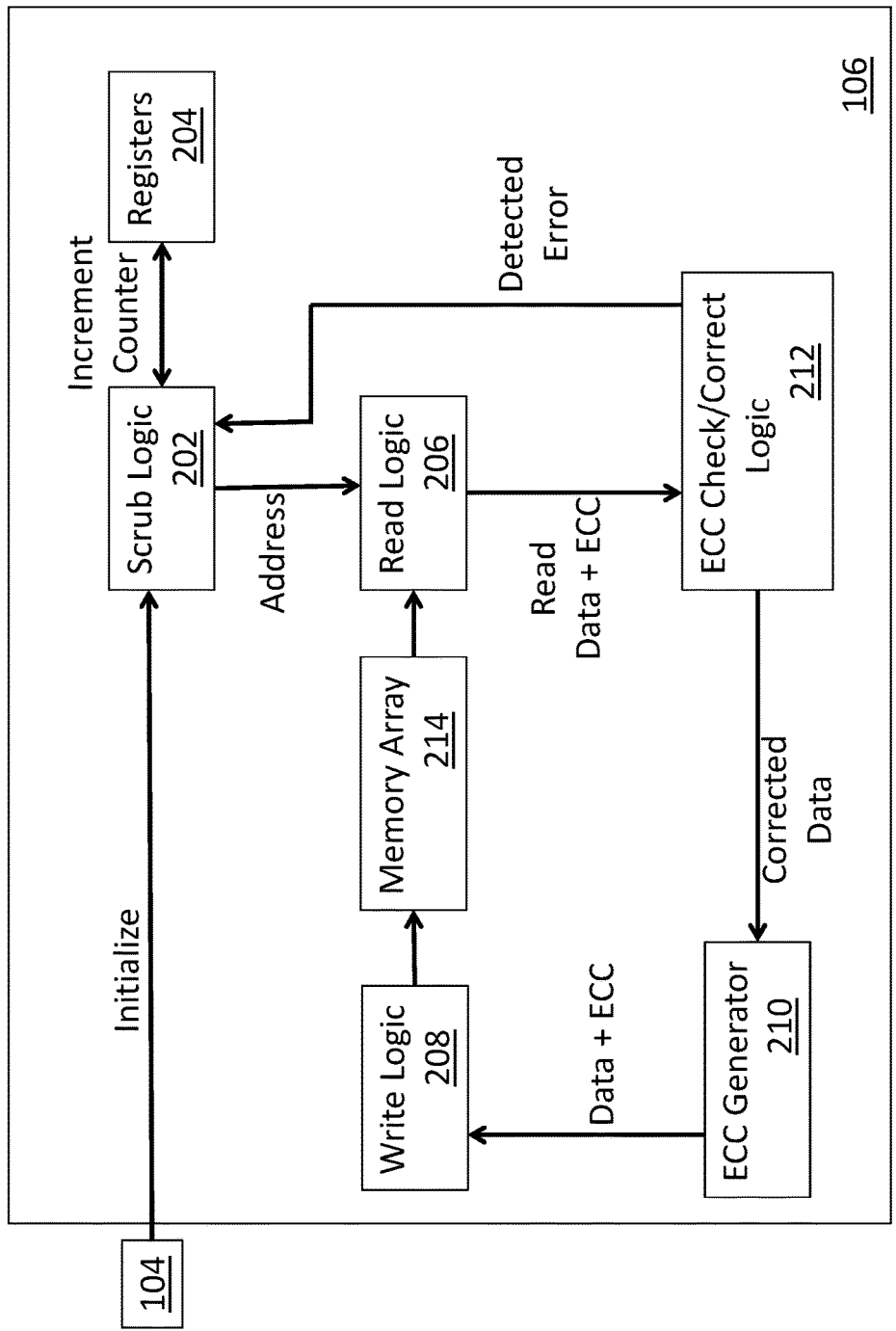
FIG. 2 is a block diagram of a memory according to one or more embodiments of the invention.
Figure 3:
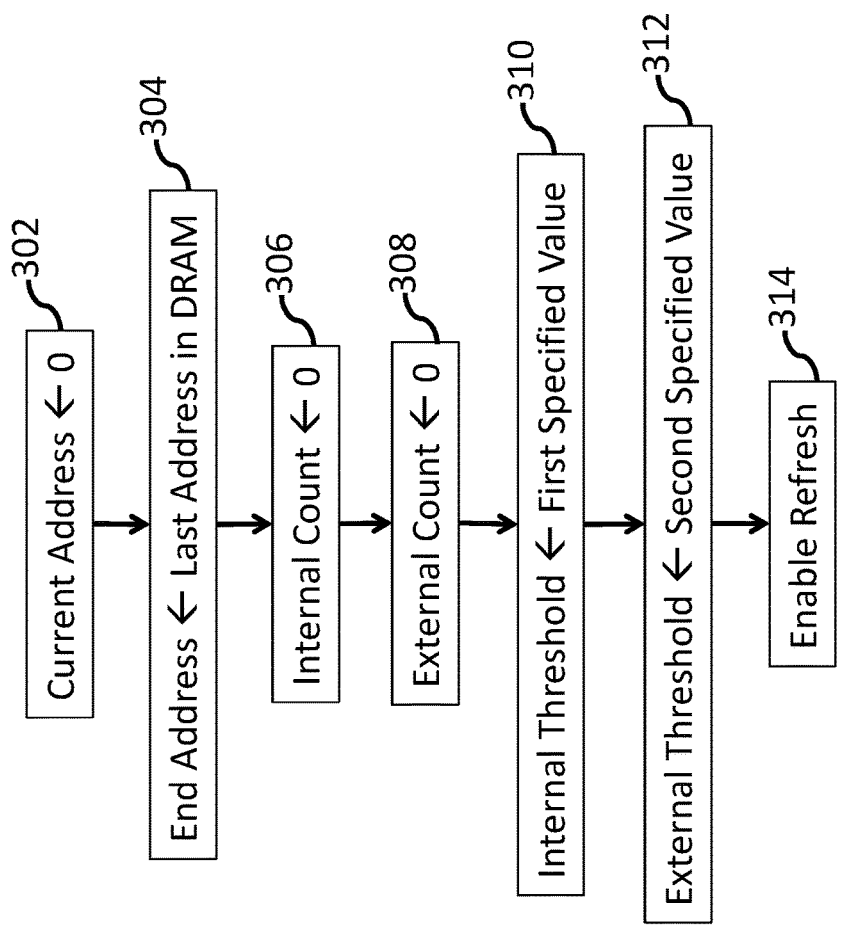
FIG. 3 is a process flow of autonomous dynamic random access memory (DRAM) scrub and error counting initialization according to one or more embodiments of the invention.

Turning now to FIG. 2, a block diagram of a memory 106 is generally shown in accordance with one or more embodiments. The memory 106 shown in FIG. 2 includes scrub logic 202 that is used to perform autonomous (independent of the memory controller) internal memory scrubbing of single bit fails in memory locations in memory array 214. One or more counters used by the scrub logic 202 to control the scrub process are stored in registers 204 located on the memory 106. As shown in FIG. 2, the scrub logic 202 is initialized by the memory controller 104. In an embodiment, the memory controller 104 initializes values of scrub addresses, counters and thresholds as shown in FIG. 3 as part of enabling refresh for the memory 106. In another embodiment, the memory controller 104 instructs the scrub logic 202 on the memory 106 to perform the initialization process shown in FIG. 3 using for example a MRS command to set the memory 106 to scrub mode and an address pointer to a point to a word location in the memory 106 for a scrub operation at that memory location.

The scrub logic 202 cycles through each of the memory locations in the memory array 214 to write corrected data values to the memory array 214. In this manner, the flipped bits are corrected in the memory array 214 and no longer need to be corrected when the data is read from the memory 106. As shown in FIG. 2, the scrub logic 202 sends the current address of the memory location to be scrubbed to read logic 206 which reads the data from the memory array 214 at that memory location. The read data and ECC bits are input to ECC check/correct logic 212 to check for and correct any bit errors in the read data. The ECC check/correct logic 212 notifies the scrub logic 202 of any detected bit errors and the scrub logic 202 increments an error counter and stores it in one of the registers 204.

As shown in FIG. 2, the corrected data is output from the ECC check/correct logic 212 and input to an ECC generator 210. The ECC generator 210 generates ECC bits for the corrected data and outputs data and ECC bits to write logic 208 which writes the data and ECC bits to the memory array. This process that includes the read logic 206, ECC check/correct logic 212, ECC generator 210, and write logic 208 is referred to as a RMW process which is used as part of the scrub operation to write corrected data to the memory 106. In some embodiments, the modifying and writing portions of the RMW process are only performed when an error is detected in the read data by the ECC check/correct logic 212.

In an embodiment, each cycle through the RMW process shown in FIG. 2 is performed in response to receiving a refresh command at the memory 106, thus eliminating the need for a separate scrub command. When a refresh command is registered at the memory 106, the current location pointed to by the internal address pointer is scrubbed and the pointer is incremented to the next location in the memory.

In an embodiment, the scrub logic 202 utilizes elements in an existing memory. All or a portion of one or more of the registers 204, read logic 206, ECC check/correct logic 212, ECC generator 210, write logic 208 and memory array 214 are used by both the scrub operation and other memory operations (e.g., read, write).

Turning now to FIG. 3, a process flow of autonomous DRAM scrub and error counting initialization is generally shown in accordance with one or more embodiments. The initializing shown in FIG. 3 can be controlled by the memory controller 104 and/or by the scrub logic 202 located in the memory 106.

Blocks 302 through 310 can be performed as part of the initializing that happens when a DRAM (memory) is powered on. At block 302, a pointer to a current address of the DRAM is set to zero (e.g., it points to the first memory location in the DRAM), and at block 304 the end address pointer is set to the last address in the DRAM (e.g., it points to the last memory location in the DRAM). At block 306, an internal count is set to zero; at block 308, an external count is set to zero; and at block 310, an internal threshold is set to a first specified value. The first specified value can be stored on the DRAM and set by the DRAM manufacturer and not visible to purchasers of the DRAM. The first specified value represents an expected number of bit errors as determined by the DRAM manufacturer. The use of the internal threshold by embodiments described herein allows DRAM manufacturers to specify an expected number of bit errors that are not reported or tracked by the scrub process.

Block 312 can be performed before the refresh command is enabled on the DRAM. At block 312, an external threshold is set to a second specified value. The second specified value represents a number of bit errors in excess of the manufacturer expected number of bit errors that should result in an alert (e.g., to the memory controller 104). The second specified value is programmable by purchases of the DRAM and can vary based on a current workload using the DRAM or characteristics of data stored on the DRAM. At block 314, refresh is enabled for the DRAM.

All or a subset of the pointers, counters, threshold, and/or values can be stored in registers on the DRAM.

Figure 4:
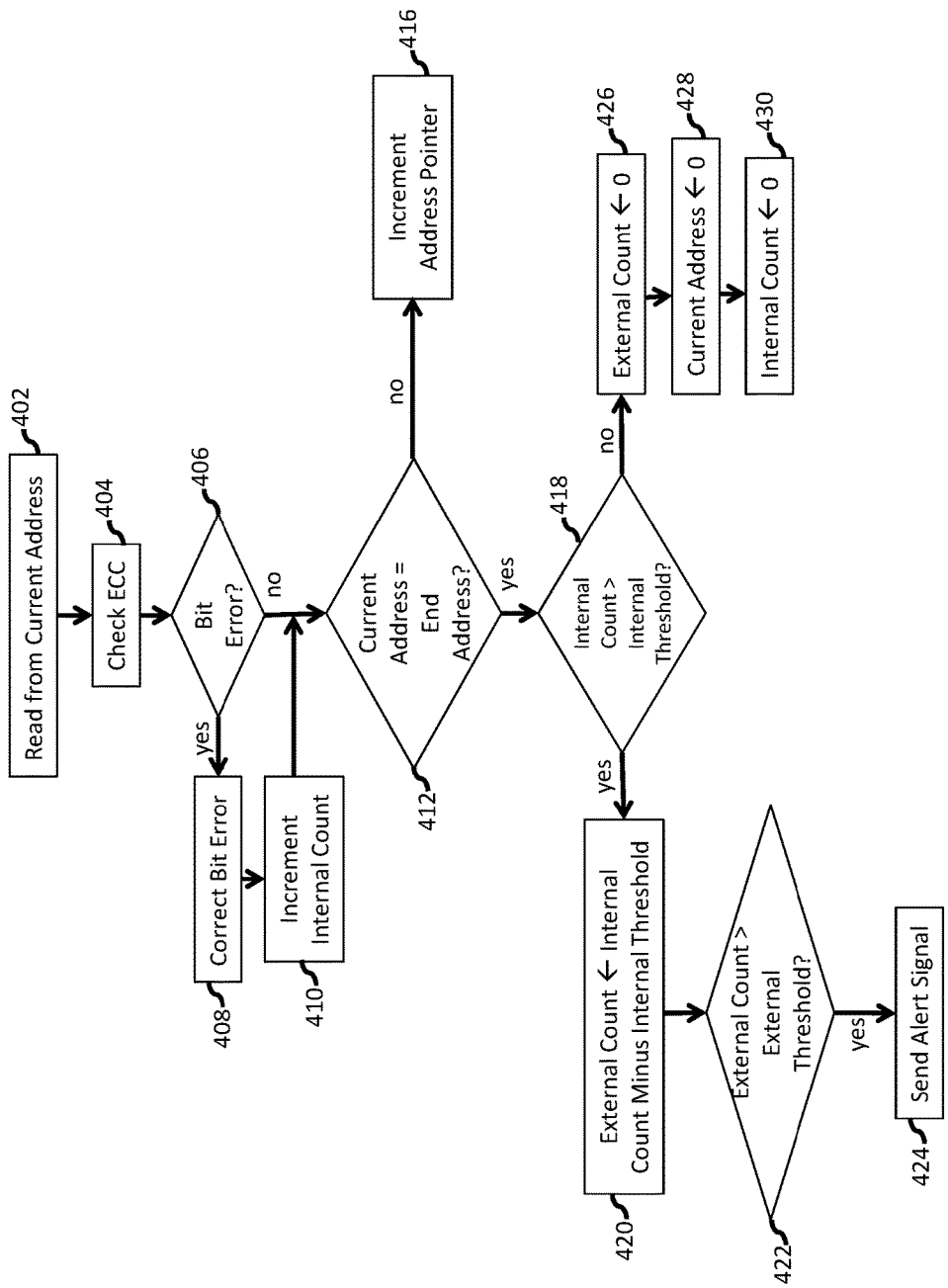
FIG. 4 is a process flow of autonomous DRAM scrub and error counting according to one or more embodiments of the invention.

Turning now to FIG. 4, a process flow of autonomous DRAM scrub and error counting is generally shown in accordance with one or more embodiments. In an embodiment, the processing shown in FIG. 4 is performed by scrub logic (e.g., scrub logic 202) located on a DRAM in response to the DRAM receiving a refresh command. At block 402, a read is performed (e.g., by read logic 206) from a memory location in the DRAM at a current address indicated, for example by a current address pointer. At block 404, an ECC check is performed (e.g., by ECC check/correct logic 212) on the bits that were read from the memory location at the current address. At block 406, it is determined whether any of the bits in the read data have an incorrect value. If a bit error occurred, then block 408 is performed and the bit error is corrected. Correcting the bit error at block 408 can include generating corrected data (e.g., by ECC check/correct logic 212), generating ECC bits for the corrected data (e.g., by ECC generator 210) and writing the corrected data and ECC bits (e.g., by write logic 208) to the current memory location (e.g., in the memory array 214). The internal count of bit errors is incremented at block 410. After the RMW process is completed, processing continues at block 412.

If it is determined at block 408, that a bit error did not occur, then block 412 is performed. At block 412, it is determined whether all of the memory locations in the DRAM have been scrubbed. In an embodiment, this is performed by comparing the current address, as indicated by the current address pointer, to the end address in the DRAM. If the current address is not the end address, then all of the memory locations in the DRAM have not been scrubbed and processing continues at block 416. At block 416, the pointer to the current address is incremented to the next memory location in the DRAM.

If, it is determined at block 412, that all of the memory locations in the DRAM have been scrubbed, then processing continues at block 418 where it is determined whether more errors than that expected by the DRAM manufacturer were detected during the scrub processing of the DRAM. This is performed at block 418 by determining if the internal count is greater than the internal threshold that was set by the DRAM manufacturer.

If more than the expected number of errors were detected during the scrub processing of the DRAM, then processing continues at block 420. At block 420, the external count is set to the internal count minus the internal threshold, resulting in the external count reflecting the number of errors in excess of the manufacturer expected number of errors that were detected during the scrub processing of the DRAM. If the number of errors in excess of the manufacturer expected number of errors is more than the threshold set by the user of the DRAM, as indicted by the external count being greater than the external threshold at block 422, then processing continues at block 424. At block 424, an alert is sent to, for example, the memory controller. The alert indicates that more than an expected number of bit errors have been detected. The alert may include a number of bit errors that were detected in excess of the manufacturer expected number of errors as reflected in the external count.

If the number of errors has not exceeded the internal threshold, as determined at block 418, then processing continues at block 426. At block 426, the external count is reset to zero; at block 428, the current address is reset to the first address in the DRAM; and at block 430, the internal count is reset to zero. In an embodiment, the next time that the refresh command is received at the DRAM the scrub operation will start at the first memory location in the DRAM with reset counters.

In embodiments, such as that shown in FIG. 4, the RMW process does not include the modifying and writing unless a bit error is detected in the data that was read. In other embodiments, the modifying and writing is always performed as part of the RMW process whether or not a bit error was detected in the data that was read.

Technical effects and benefits include an autonomous internal DRAM scrubbing of single bit fails. In embodiments, either an alert signal or polling can be used to tell communicate to a memory controller if the error counts gets too high. DRAM vendors can maintain their own internal threshold based on what they consider normal, and this value can remain hidden from users of the DRAM. In embodiments, the memory controller does not need visibility to errors found and corrected by the DRAM, because the DRAM itself is performing the scrub. This can result in freeing up the mainline between the DRAM and the memory controller by not having separate scrub commands sent to DRAM. According to embodiments, all internal locations in the DRAM will be scrubbed atomically.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of dynamic random access memory (DRAM) scrub and error counting in a memory of a computer system, the method comprising:
performing autonomous scrub operations at memory locations in a DRAM based on a timing of refresh operations at the DRAM, the DRAM comprising a memory array, and one or more registers for storing an internal address pointer, an error count, and an error threshold, the performing including repeating a cycle that includes a scrub operation and a refresh operation until a read/modify/write (RMW) operation has been performed at each of the memory locations in the memory array, the cycle comprising:
receiving an indication that a refresh command has been registered at the DRAM;
triggering execution of the RMW operation based on receiving the indication that a refresh command has been registered at the DRAM;
based on the triggering, executing the RMW operation at a memory location in the memory array indicated by the internal address pointer, the executing including writing corrected bits to the memory location;
incrementing the error count in response to detecting an error during the executing; and
incrementing the internal address pointer to indicate a next memory location in the memory array;
comparing the error count to the error threshold, wherein the error threshold indicates a number of errors in excess of an expected number of errors, the expected number of errors set by a manufacturer of the DRAM and not visible to purchasers or users of the DRAM; and
initiating an alert in response to the error count exceeding the error threshold.

2. The method of claim 1, wherein the performing is independent of a memory controller.

3. The method of claim 1, wherein the comparing and the initiating are in response to a request from a memory controller.

4. The method of claim 1, wherein the refresh command is registered by a memory controller.

5. The method of claim 1, wherein the DRAM is in a self-refresh mode and the refresh command is registered by the DRAM.

6. The method of claim 1, further comprising:
resetting the error count to zero subsequent to the comparing; and
repeating the performing and comparing.

7. The method of claim 1, wherein the alert is sent to a memory controller via a dedicated pin on the DRAM, and the alert includes the number of errors in excess of an expected number of errors.

8. The method of claim 1 further comprising:
resetting the error count to zero subsequent to the comparing; and
repeating the performing and comparing, wherein
the DRAM is in a self-refresh mode,
the refresh command is registered by the DRAM.,
the alert includes the number of errors in excess of an expected number of errors, and
the alert is sent to a memory controller via a dedicated pin on the DRAM, and the method further comprises.

9. A memory system comprising:
a memory device, the memory device including a dynamic random access memory (DRAM), the DRAM comprising a memory array, and one or more registers for storing an internal address pointer, an error count, and an error threshold, the memory device configured for:
performing autonomous scrub operations at memory locations in the DRAM based on a timing of refresh operations at the DRAM, the performing including repeating a cycle that includes a scrub operation and a refresh operation until a read/modify/write (RMW) operation has been performed at each of the memory locations in the memory array, the cycle comprising:
receiving an indication that a refresh command has been registered at the DRAM;
triggering execution of the RMW operation based on receiving the indication that a refresh command has been registered at the DRAM;
based on the triggering, executing the RMW operation at a memory location in the memory array indicated by the internal address pointer, the executing including writing corrected bits to the memory location;
incrementing the error count in response to detecting an error during the executing; and
incrementing the internal address pointer to indicate a next memory location in the memory array;
comparing the error count to an error threshold, wherein the error threshold indicates a number of errors in excess of an expected number of errors, the expected number of errors set by a manufacturer of the DRAM and not visible to purchasers or users of the DRAM; and
initiating an alert in response to the error count exceeding the error threshold.

10. The memory system of claim 9, wherein the performing is independent of a memory controller.

11. The memory system of claim 9, wherein the comparing and the initiating are in response to a request from a memory controller.

12. The memory system of claim 9, wherein the refresh command is registered by a memory controller.

13. The memory system of claim 9, wherein the DRAM is in a self-refresh mode and the refresh command is registered by the DRAM.

14. The memory system of claim 9, wherein the memory device is further configured for:
  resetting the error count to zero subsequent to the comparing; and
  repeating the performing and comparing.

15. The memory system of claim 9, wherein the alert is sent to a memory controller via a dedicated pin on the DRAM, and the alert includes the number of errors in excess of an expected number of errors.

16. The memory system of claim 9, wherein the memory device is further configured for:
  resetting the error count to zero subsequent to the comparing; and
  repeating the performing and comparing, wherein
    the DRAM is in a self-refresh mode,
    the refresh command is registered by the DRAM.,
    the alert includes the number of errors in excess of an expected number of errors, and
    the alert is sent to a memory controller via a dedicated pin on the DRAM, and the method further comprises.

17. A computer program product for dynamic random access memory (DRAM) scrub and error counting in a memory of a computer system, the computer program product comprising a computer readable storage medium having program instructions embodied therewith, the program instructions executable by processing circuitry to cause the processing circuitry to:
  perform autonomous scrub operations at memory locations in the DRAM based on timing of refresh operations at the DRAM, the DRAM comprising a memory array, and one or more registers for storing an internal address pointer, an error count, and an error threshold, the performing including repeating a cycle that includes a scrub operation and a refresh operation until a read/modify/write (RMW) operation has been performed at each of the memory locations in the memory array, the cycle comprising:
    receiving an indication that a refresh command has been registered at the DRAM;
    triggering an execution of the RMW operation based on receiving the indication that a refresh command has been registered at the DRAM;
    based on the triggering, executing the RMW operation at a memory location in the memory array indicated by the internal address pointer, the executing including writing corrected bits to the memory location;
    incrementing the error count in response to detecting an error during the executing; and
    incrementing the internal address pointer to indicate a next memory location in the memory array;
  compare the error count to an error threshold, wherein the error threshold indicates a number of errors in excess of an expected number of errors, the expected number of errors set by a manufacturer of the DRAM and not visible to purchasers or users of the DRAM; and
  initiate an alert in response to the error count exceeding the error threshold.

18. The computer program product of claim 17, wherein the performing is independent of a memory controller.

19. The computer program product of claim 17, wherein the program instructions are further executable by the processing circuitry to:
  reset the error count to zero subsequent to the comparing; and
  repeat the performing and comparing, wherein
    the DRAM is in a self-refresh mode,
    the refresh command is registered by the DRAM.,
    the alert includes the number of errors in excess of an expected number of errors, and
    the alert is sent to a memory controller via a dedicated pin on the DRAM, and the method further comprises.

* * * * *